United States Patent [19]

Oshida et al.

[11] 3,997,386
[45] Dec. 14, 1976

[54] METHOD FOR BONDING THERMOPLASTIC HIGH MOLECULAR WEIGHT MATERIALS

[75] Inventors: Yoshiki Oshida; Hiroaki Kita, both of Yokohama, Japan

[73] Assignee: Mitsubishi Jukogyo Kabushiki Kaisha, Tokyo, Japan

[22] Filed: Apr. 30, 1975

[21] Appl. No.: 573,333

[30] Foreign Application Priority Data

May 31, 1974 Japan .............................. 49-60903

[52] U.S. Cl. .............................. 156/306; 93/DIG. 1; 156/311; 156/322; 264/234; 264/345; 264/237; 264/348; 264/248; 428/520

[51] Int. Cl.² ......................... C09J 5/00; B65C 9/25

[58] Field of Search .......... 156/306, 312, 304, 157, 156/311, 322, 324, 272; 428/518, 520; 264/248, 345, 234, 237, 348; 229/48 T; 93/DIG. 1

[56] References Cited

UNITED STATES PATENTS

| | | | |
|---|---|---|---|
| 2,520,737 | 8/1950 | Romeyn et al. | 156/306 |
| 2,537,666 | 1/1951 | Gowing | 156/306 |
| 2,878,154 | 3/1959 | Cheney et al. | 156/306 |
| 3,107,784 | 10/1963 | Alder et al. | 156/306 |
| 3,240,648 | 3/1966 | Bradley | 156/306 |
| 3,573,153 | 3/1971 | Ryan | 156/306 |
| 3,616,004 | 10/1971 | Samson | 156/306 |
| 3,681,167 | 8/1972 | Moore | 156/311 |

*Primary Examiner*—Charles E. Van Horn
*Assistant Examiner*—J. J. Gallagher
*Attorney, Agent, or Firm*—Cushman, Darby & Cushman

[57] ABSTRACT

An improved method for bonding same or different thermoplastic high molecular weight materials is described, in which the respective materials to be bonded are heated until their respective temperatures reach a temperature a little lower than the respective second order transition points, when a pressing force is applied to a butting surface between the materials to be bonded, and after the materials have been in themselves further heated up to a temperature 20° – 50° C higher than the higher second order transition point if the second order transition points of the respective materials are different, the materials are slowly cooled down to a temperature lower than the lower second order transition point.

6 Claims, No Drawings

METHOD FOR BONDING THERMOPLASTIC HIGH MOLECULAR WEIGHT MATERIALS

BACKGROUND OF THE INVENTION

The present invention relates to a method for bonding the same or different thermo-plastic high molecular weight materials, and more particularly, to a method for bonding thermo-plastic high molecular weight materials in which the bonding can be accomplished with a small shaping pressure and also no residual stress remains in the bonded portion.

Methods for bonding thermo-plastic high molecular weight materials in the prior art include a thermal bonding process in which the materials are bonded under a heated and molten state, a high frequency or supersonic bonding process. However, these prior art processes had disadvantages in that the former process necessitates heating the materials up to a high temperature and the latter process requires the materials to have a large coefficient of friction.

Therefore, it is a principal object of the present invention to provide a method for bonding the same or different thermo-plastic high molecular weight materials in which the bonding can be achieved at a relatively low temperature without requiring the materials to have a large coefficient of friction.

DETAILED DESCRIPTION OF THE INVENTION

The inventors of the present application have been engaged in experimental research on super-plastic phenomena of high molecular materials at their second order transition points (glass transition point: hereinafter referred to as Tg point), and have accomplished the present invention on the basis of the discovery that the aforementioned object of the invention can be achieved by making use of this super-plastic phenomena.

According to one feature of the present invention, there is provided a method for bonding the same or different thermo-plastic high molecular weight materials, characterized in that the respective materials to be bonded are heated until their respective temperatures reach a temperature a little lower than the respective second order transition points of each, then a pressing force is applied to a butting surface between the materials to be bonded, and after the materials have been in themselves further heated up to a temperature 20°–50° C higher than the higher second order transition point, the materials are slowly cooled down to a temperature lower than the lower second order transition point.

The method for bonding thermo-plastic high molecular weight materials according to the present invention will now be described in more detail with respect to the case of bonding same kind of thermoplastic high molecular weight materials.

Two members made of the same kind of thermo-plastic high molecular weight materials are heated with an electric heater or a hot air blower at an appropriate heating speed such as, for example, at a heating speed of about 10° C/sec., and when the temperature of the members has reached a temperature a little lower than a Tg point possessed by the materials to be bonded such as, for example, a temperature about 10° C lower than the Tg point during the heating process, the members are contacted together with a pressing force much smaller than the tensile strength of the thermo-plastic high molecular weight materials at a room temperature such as, for example, a pressing force equal to about 1/10 of the tensile strength. Thereafter, the members under the pressing force are in themselves continuously heated up to a temperature 20°–50° C higher than the Tg point, preferably to a temperature about 30° C higher than the Tg point, and then the members are cooled at an appropriately slow cooling speed such as, for example, at a cooling speed of 5° C/sec. down to a temperature lower than the Tg point, preferably to a temperature about 30° C lower than the Tg point. At this point of time the pressing force is released and subsequently the members are cooled down to room temperature. In case of a thermo-plastic high molecular weight material having a considerably high Tg point with respect to room temperature, when the temperature of the material exceeds the Tg point as described above, the high molecular weight segments in the material would abruptly increase their diffusion velocity and thus could form an excellent bonding as a result of tangle between the macromolecules. The reason why the highest heating temperature was selected at the temperature 20°–50° C higher than the Tg point, is because in order to bring the entire bonding surface between the materials to be bonded completely to a temperature higher than the Tg point this amount of heating is essentially necessary. Though the heating speed could be faster than the cooling speed, if it is too fast then the highest heating temperature above the Tg point of the range indicated above would be possibly required to be raised further, which is not recommended in view of the loss of thermal energy. Therefore, the heating speed of about 10° C/sec. is appropriate. With regard to the cooling speed, a speed of the order of the so-called "slow cooling" is favorable in order to avoid overcooling, and thus the cooling speed of about 5° C/sec. is appropriate. In the above described example, the time point when the pressing force is applied was selected at a temperature about 10° C lower than the Tg point. However, it is to be noted that this is an example in which the thermo-plastic high molecular weight material had a Tg point considerably higher than a room temperature. It will be readily understood that in the case of a material having a Tg point near to room temperature, such as polyamide (nylon) (Tg point: 50° C), the temperature of the material will approach the Tg point within a short period of time after the heating is started, and so the heating and the application of the pressing force could be done at the same time.

Nextly, the method according to the present invention will be described in detail with respect to the case of bonding different kinds of thermo-plastic high molecular weight materials. For convenience one of the thermo-plastic high molecular weight materials is designated by A, and the other by B. Also, it is assumed that the second order transition point and the tensile strength at room temperature of the material A are represented by Tg' and S', respectively, the second order transition point and the tensile strength at a room temperature of the material B are represented by Tg'' and S'', respectively, and the following relations are satisfied:

$$Tg' > Tg'' \text{ and } S' > S''$$

First, the material A is heated up to a temperature a little lower than the Tg' point such as, for example, Tg' − 10° C, the material B is heated up to a temperature a little lower than the Tg'' point such as, for example, about Tg'' − 10° C, and the bonding surface between the respective materials is applied with a pressing force that is smaller than S'', for instance, a pressing force of the order of about S''/10. The heating is continued, and after the temperature has been raised to Tg' + 30° C, the materials are cooled down to a temperature of Tg'' − 30° C. At this point of time, the pressing force is released. As a result even between different kinds of thermo-plastic high molecular materials a sufficiently strong bonding can be achieved using only small pressing force, and furthermore, an excellent bonded portion that is free from a residual stress can be obtained.

In the following, a number of examples practically embodying the present invention will be described:

EXAMPLE 1:

Two pieces of material to be bonded made of vinyl chloride resin having a Tg point of 87° C were heated from room temperature at a heating speed of 10° C/sec., and when the temperature of the material reached 75° C, a pressing force of 150 g/mm$^2$ was applied to the bonding surface between the respective materials, then the materials were further heated up to 110° C, thereafter they were cooled down to 55° C at a cooling speed of 5° C/sec., at this point of time the pressing force was released, and then they were cooled to a room temperature by natural cooling.

The two pieces of materials were completely bonded, and the joint tensile strength of the bonded portion was about 6 kg/mm$^2$, which strength was equal to or higher than the tensile strength of the bonded materials.

EXAMPLES 2 − 8:

In the following table indicates bonding conditions using various kinds of thermo-plastic high molecular weight materials. The method for bonding is the same processes as Example 1 above. In the table, it is to be noted that Tmax represents the highest heating temperature, Tp represents the temperature at which a pressing force begins to be applied, and $T_{VP}$ represents the temperature at which the pressing force is released.

While we have described above the principle of our invention in connection with a number of preferred embodiments thereof, it is to be clearly understood that this description is made only by way of example and not as a limitation to the scope of the invention as set forth in the object thereof and in the accompanying claims.

What is claimed is:

1. A process for bonding together two pieces of high molecular weight thermoplastic materials each having substantially the same glass transition point, comprising the sequential steps of:
   a. heating both pieces to a temperature just below their glass transition point;
   b. pressing the two surfaces to be joined together and maintaining said pressure through steps (c) and (d);
   c. continuing the heating under pressure to a temperature of about 20° to about 50° C above the glass transition temperature of the thermoplastic materials;
   d. allowing the thus-heated pieces to cool to below the glass transition temperature under pressure;
   e. releasing said pressure and allowing the thus bonded pieces to cool to room temperature; thereby producing a bond having a joint tensile strength at least equal to the tensile strength of the individual thermoplastic pieces.

2. A process for bonding together two pieces of high molecular weight thermoplastic materials each having substantially the same glass transition point, comprising the sequential steps of:
   a. heating both pieces to a temperature just below their glass transition point at a rate of about 10° C/sec;
   b. pressing the two surfaces to be joined together and maintaining said pressure through steps (a), (c) and (d);
   c. continuing the heating at a rate of about 10° C/sec under pressure to a temperature of about 20° to about 50° C above the glass transition temperature of the thermoplastic materials;
   d. allowing the thus-heated pieces to cool at a rate of about 5° C/sec to below the glass transition temperature under pressure
   e. releasing said pressure and allowing the thus bonded pieces to cool to room temperature, thereby producing a bond having a joint tensile strength at least equal to the tensile strength of the individual thermoplastic pieces.

3. A process for bonding together two pieces of high molecular weight thermoplastic materials, piece A having a glass transition temperature Tg and a tensile strength S and piece B having a glass transition temperature Tg' and a tensile strength S', where Tg > Tg' and S > S', comprising the sequential steps of:
   a. heating piece A to a temperature just below Tg;
   b. heating piece B to a temperature just below Tg';

| Examples | Thermo-Plastic High Molecular Materials | Tg (° C) | Tmax (° C) | Tp (° C) | $T_{VP}$ (° C) | Pressing Force (g/mm$^2$) |
|---|---|---|---|---|---|---|
| 2 | Polyacetal Resin (Duracone) | 100 | 130 | 90 | 70 | 200 |
| 3 | Polyamide Resin (Nylon 6) | 50 | 80 | 40 | Room Temp. | 400 |
| 4 | Polyamide Resin (Nylon 6/6) | 50 | 80 | 40 | Room Temp. | 400 |
| 5 | Polycarbonate | 150 | 180 | 140 | 120 | 250 |
| 6 | ABS Resin | 120 | 150 | 110 | 90 | 250 |
| 7 | Methyl Methacrylate | 105 | 130 | 95 | 75 | 300 |
| 8 | Tetrafluoroethylene Resin (Teflon) | 126 | 160 | 115 | 95 | 100 | c. pressing the surfaces of pieces A and B to be joined together at a pressure less than S' and maintaining said pressure during steps (d) and (e);
d. continuing the heating under said pressure to a temperature of about 20° to about 50° C above Tg;
e. cooling the thus heated pieces to a temperature below Tg';
f. releasing said pressure and allowing the thus-bonded pieces to cool to room temperature; thereby producing a bond between pieces A and B having a joint tensile strength at least equal to S'.

4. The method of claim 3 wherein the heating of steps (a) and (b) is at a rate of about 10° C/sec.

5. The method of claim 3 wherein the heating of step (d) is at a rate of about 10° C/sec.

6. The method of claim 3 wherein the cooling of step (e) is at a rate of about 5° C/sec.